(12) United States Patent
Luke et al.

(10) Patent No.: US 7,395,446 B2
(45) Date of Patent: Jul. 1, 2008

(54) SYSTEMS AND METHODS FOR THE IMPLEMENTATION OF A PEER-TO-PEER RULE-BASED PULL AUTONOMOUS SYNCHRONIZATION SYSTEM

(75) Inventors: Hok-Sum Horace Luke, Mercer Island, WA (US); David W. Williams, Woodinville, WA (US); Otto G. Berkes, Seattle, WA (US); Victor Keith Blanco, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 341 days.

(21) Appl. No.: 10/929,303

(22) Filed: Aug. 30, 2004

(65) Prior Publication Data

US 2005/0262371 A1 Nov. 24, 2005

Related U.S. Application Data

(60) Provisional application No. 60/567,557, filed on May 3, 2004.

(51) Int. Cl.
*G06F 1/04* (2006.01)
(52) U.S. Cl. ............... 713/375; 709/212; 709/213
(58) Field of Classification Search ............... 713/375, 713/400; 709/212, 213
See application file for complete search history.

(56) References Cited

U.S. PATENT DOCUMENTS 6,671,705 B1* 12/2003 Duprey et al. ............ 707/204
6,823,349 B1* 11/2004 Taylor et al. ............. 707/204
2001/0048728 A1* 12/2001 Peng ....................... 375/354
2003/0050910 A1* 3/2003 Ramanujam et al. ......... 707/1
2004/0139180 A1* 7/2004 White et al. ............. 709/221
2005/0081205 A1* 4/2005 Carney .................... 718/100
2005/0099963 A1* 5/2005 Multer et al. ............ 370/254
2005/0191998 A1* 9/2005 Onyon et al. ............ 455/419

OTHER PUBLICATIONS

Jon Hamilton, GETPATCH, v 2.0, Jan. 15, 1996, http://fresh.t-systems-sfr.com/linux/src/getpatch-2.21.tar.gz:a/getpatch-2.21/getpatch, pp. 1-7.*
Stephane Hamel, Automatic Patch Retrieval & Installation, Mar. 8, 1994, http://groups.google.com/group/comp.sys.sun.admin/browse_thread/thread/bbe02ce0d52f64a?tvc=2&q=getpatch&fwc=1, pp. 1-5.*

* cited by examiner

*Primary Examiner*—Thomas Lee
*Assistant Examiner*—Malcolm D Cribbs
(74) *Attorney, Agent, or Firm*—Woodcock Washburn LLP (57) ABSTRACT

The present invention relates to a synchronization system that utilizes a synchronization wizard ("PullSync") residing on a first computer device to request and receive (or "pull") data from a second computer device. The first computer device (the "syncer") copies files from shared folders on the second computer device (the "syncee") in accordance with specific pull-synchronization rules (PSRs) established on the syncer that define the scope and extent of the synchronization. This copying occurs over a network connection using existing and well-defined protocols by which one computer system is able to view and copy files from the available shared folders of a second computer system, and the PullSync wizard software needs to exist only on the first computer system (the syncer) to utilize these existing networking protocols (including existing security/authentication protocols) to selectively copy files from the second computer system.

30 Claims, 3 Drawing Sheets

SYSTEMS AND METHODS FOR THE IMPLEMENTATION OF A PEER-TO-PEER RULE-BASED PULL AUTONOMOUS SYNCHRONIZATION SYSTEM

CROSS-REFERENCE

This application claims benefit of U.S. Provisional Application No. 60/567,557, entitled "SYSTEMS AND METHODS FOR THE IMPLEMENTATION OF A PEER-TO-PEER RULE-BASED PULL AUTONOMOUS SYNCHRONIZATION SYSTEM," filed May 3, 2004, the entire contents of which are hereby incorporated herein by reference.

TECHNICAL FIELD

The present invention relates generally to peer-to-peer synchronization and, more specifically, to a peer-to-peer rule-based pull autonomous synchronization system with particular application to mobile devices such as laptops and handheld computers, among other things.

BACKGROUND

As well known and readily appreciated by those of skill in the art, there are several reasons for synchronizing data between two or more computer systems, and there are a plethora of schemes, strategies, and technical solutions for doing so. However, many of these synchronization schemes in the existing art have functional limitations that diminish the efficiency and efficacy of synchronization in networks and, particularly, in dynamic networks. For example, typical client-server synchronization schemes are highly structured and require a well-defined relationship between each computer system usually maintained by the "server" in the client-server relationship. This is particularly problematic for dynamic synchronization where certain systems that enter a synchronization network have to first be identified and/or defined in that network before synchronization can occur. In addition, many of these synchronization schemes also require specialized synchronization software on both computer systems, and so one computer system lacking this specialized software cannot dynamically be synced to another computer having specialized synchronization software.

While these many shortcomings can be detrimental to synchronization in general, they are particularly troublesome for mobile computing devices that may dynamically move in and out of certain communication networks and synchronization networks. Mobile devices in particular require a highly flexible and dynamic synchronization schema that requires minimal overhead. The invention described herein addresses these shortcoming.

SUMMARY

Various embodiments of the present invention are directed to systems and method for a peer-to-peer rule-based pull autonomous synchronization system that is particularly well-suited to mobile devices but which also has significant operational advantages over existing synchronization schemes.

Several embodiments of the present invention are directed to a synchronization system that comprises the utilization of a synchronization wizard (hereinafter referred to as "PullSync") that resides (i.e., is installed and executed) on a first computer device that will request and receive (or "pull") data from a second computer device in order for the first computer device to synchronize with the second computer device. To synchronize, the first computer device (the "syncer") copies files from shared folders on the second computer device (the "syncee") in accordance with specific PullSync rules (PSRs) established on the syncer that define the scope and extent of the synchronization (discussed later herein). The aforementioned copying occurs over a network connection using existing and well-defined protocols by which one computer system is able to view and copy files from the available shared folders of a second computer system. For certain embodiments of the present invention, the PullSync wizard software exists only on the first computer system (the syncer) and utilizes these existing networking protocols (including but not limited to wireless communication protocols) to selectively copy files from the second computer system based on the PSRs of the PullSync wizard on said first computer system. Moreover, PullSync may also utilize existing security protocols and technology which would already be in place for these computer systems for standard network communications (including but not limited to wireless communication protocols).

BRIEF DESCRIPTION OF THE DRAWINGS

The foregoing summary, as well as the following detailed description of preferred embodiments, is better understood when read in conjunction with the drawings, tables, and/or other visual representations including herewith (if any). For the purpose of illustrating the invention, there may also be shown in these drawings exemplary constructions of the invention or illustrations of functionality and methods; however, the invention is not limited to the specific methods and instrumentalities disclosed.

DETAILED DESCRIPTION

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Computer Environment

Figure 1:
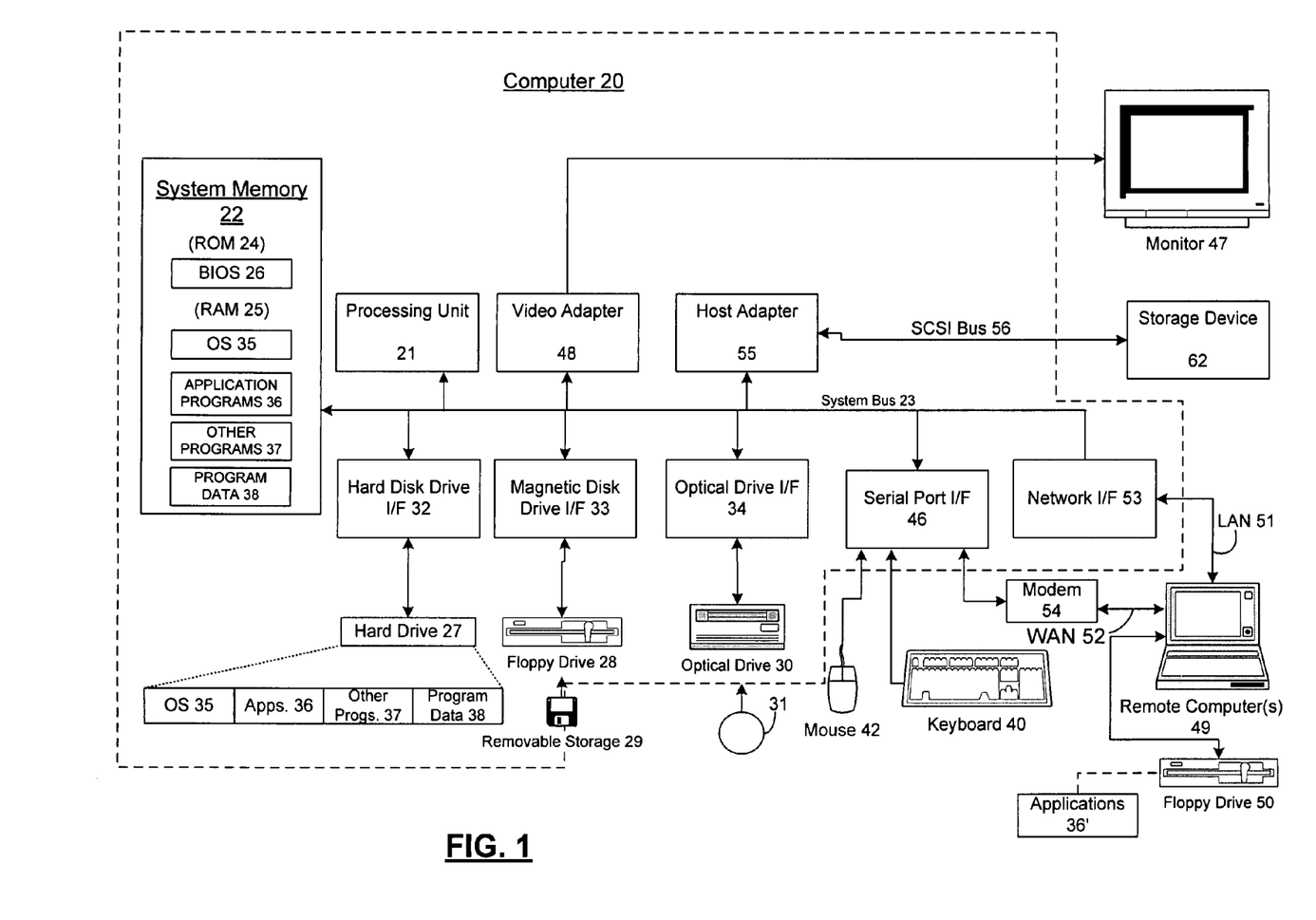
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While it is envisioned that numerous embodiments of the present invention are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

Network Environment

Figure 2:
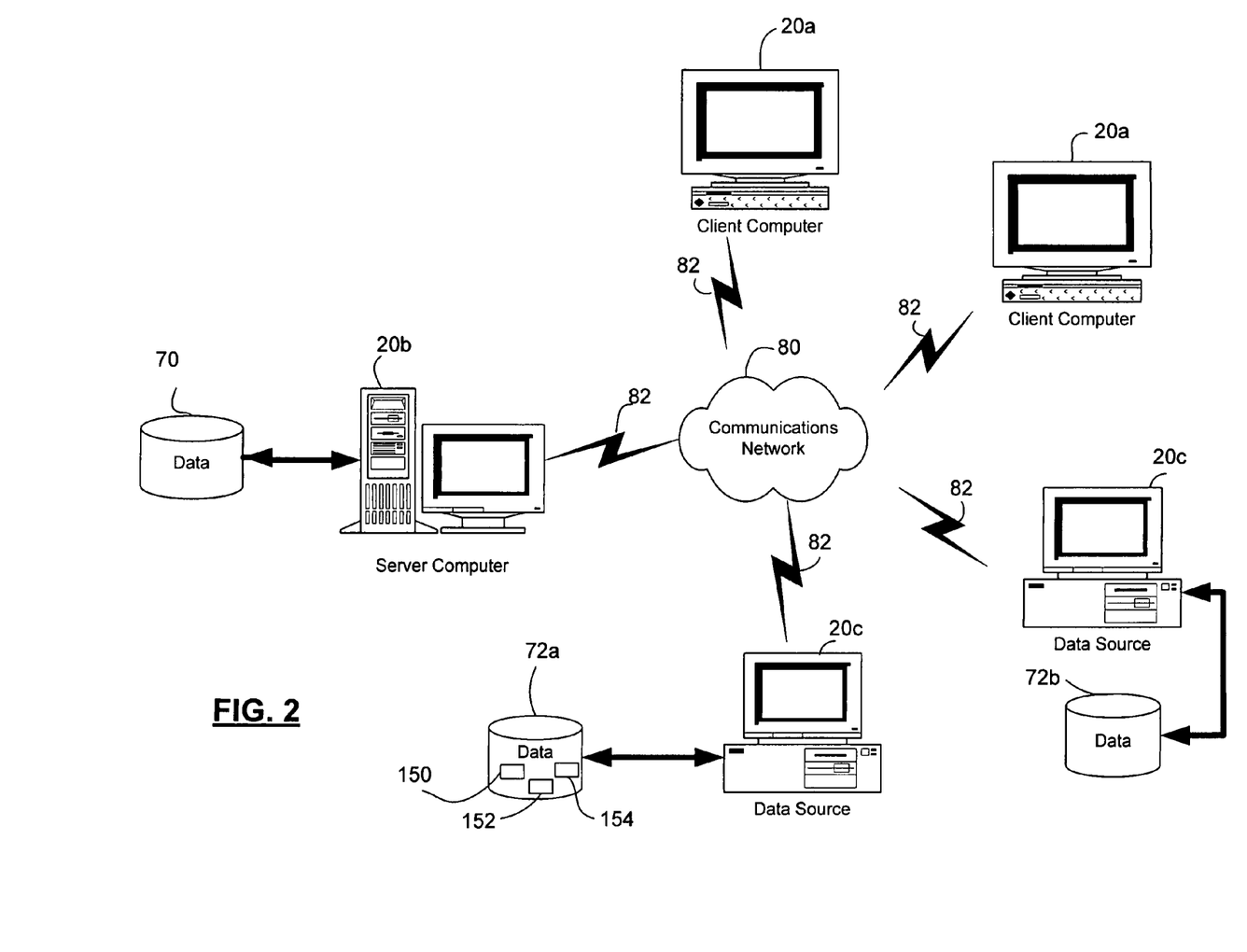
FIG. 2 is block diagram representing a traditional network configuration in which aspects of the present invention may be incorporated.

FIG. 2 illustrates an exemplary network environment in which aspects of the present invention may be employed. Of course, actual network and data structure environments can be arranged in a variety of configurations; however, the exemplary environment shown here provides a framework for understanding the type of environment in which the present invention operates.

The network may include client computers 20a, a server computer 20b, data source computers 20c, and data structures 70, 72a, and 72b. The client computers 20a and the data source computers 20c are in electronic communication with the server computer 20b via communications network 80, e.g., an intranet. Client computers 20a and data source computers 20c are connected to the communications network by way of communications interfaces 82. Communications interfaces 82 can be any one of the well-known communications interfaces such as Ethernet connections, modem connections, and so on.

Server computer 20b provides management of data structure 70 by way of data structure server system software, described more fully below. As such, server 20b acts as a storehouse of data from a variety of data sources and provides that data to a variety of data consumers.

In the example of FIG. 2, data sources are provided by data source computers 20c. Data source computers 20c communicate data to server computer 20b via communications network 80, which may be a LAN, WAN, Intranet, Internet, or the like. Data source computers 20c store data locally in data structures 72a, 72b, which may be relational data structure servers, excel spreadsheets, files, or the like. For example, data structure 72a shows data stored in tables 150, 152, and 154. The data provided by data sources 20c is combined and stored in a large data structure such as a data warehouse maintained by server 20b. Client computers 20a that desire to use the data stored by server computer 20b can access the data structure 70 via communications network 80. Client computers 20a request the data by way of SQL queries (e.g., update, insert, and delete) on the data stored in data structure 70.

PullSync

Various embodiments of the present invention are directed to systems and methods for synchronizing data between computer devices. For several embodiments, the synchronization system comprises the utilization of a synchronization wizard (hereinafter referred to as "PullSync") that resides (i.e., is installed and executed) on a first computer device that will request and receive (or "pull") data from a second computer device in order for the first computer device to synchronize with the second computer device.

To synchronize, the first computer device (the "syncer") copies files from shared folders on the second computer device (the "syncee") in accordance with specific pull-synchronization rules (PSRs) established on the syncer that define the scope and extent of the synchronization (discussed later herein). The aforementioned copying occurs over a network connection using existing and well-defined protocols by which one computer system is able to view and copy files from the available shared folders of a second computer system. As well-known and readily appreciated by those of skill in the art, the files in shared folders of a computer system (in this case, the second computer device syncee) are, by operation of the established network protocols, completely visible to other computer systems (in this case, the first computer device syncer) having standard networking communications capabilities for accessing the second computer system (syncee) via a network connection of some kind. Indeed, when a computer system copies (or "pulls") files from the shared folders of another computer system, it can be said that the second computer system is not even aware of the copying of the files in its shared folders to the first computer system (even though the second computer system does in fact execute specific system-level commands in support of the copying files to the first computer system, for example, executing the commands necessary to perform a read from the persistent data store of the second computer system). Thus, for several embodiments of the present invention, the PullSync wizard software that exists only on the first computer system (the syncer) utilizes these existing networking protocols (including but not limited to wireless communication protocols) to selectively copy files from the second computer system based on the PSRs of the PullSync wizard on said first computer system. Moreover, PullSync may also utilize existing security protocols and technology which would already be in place for these computer systems for standard network communications (including but not limited to wireless communication protocols).

Thus, by using the existing network protocols, PullSync only needs to reside on the syncer computer system—that is, the first computer system that is "pulling" the files from the second computer system—for said syncer computer system to sync with other (second/syncee) computer systems to which it can access via a network (wired or wireless), while the syncee requires no special programming aside from the well-established network protocols that would already exist on a networked computer system and which allow this seamless viewing and copying to occur. Consequently, any computer system residing on a network having files in shared folders is a potential syncee by the very fact that its shared folder contents can be viewed and copied over a network to another computer system.

Similarly, while not required, a specific computer system can be both a syncee—by being a computer system on a network and having files in shared folders—as well as a syncer—by the installation and execution of PullSync wizard to pull files from shared folders of other computer systems on a network according to local PSRs. Thus two computer systems, each having files in shared folders, and each executing PullSync, can fully synchronize with each other to the extent defined by the PSRs established on each respective computer.

Figure 3:
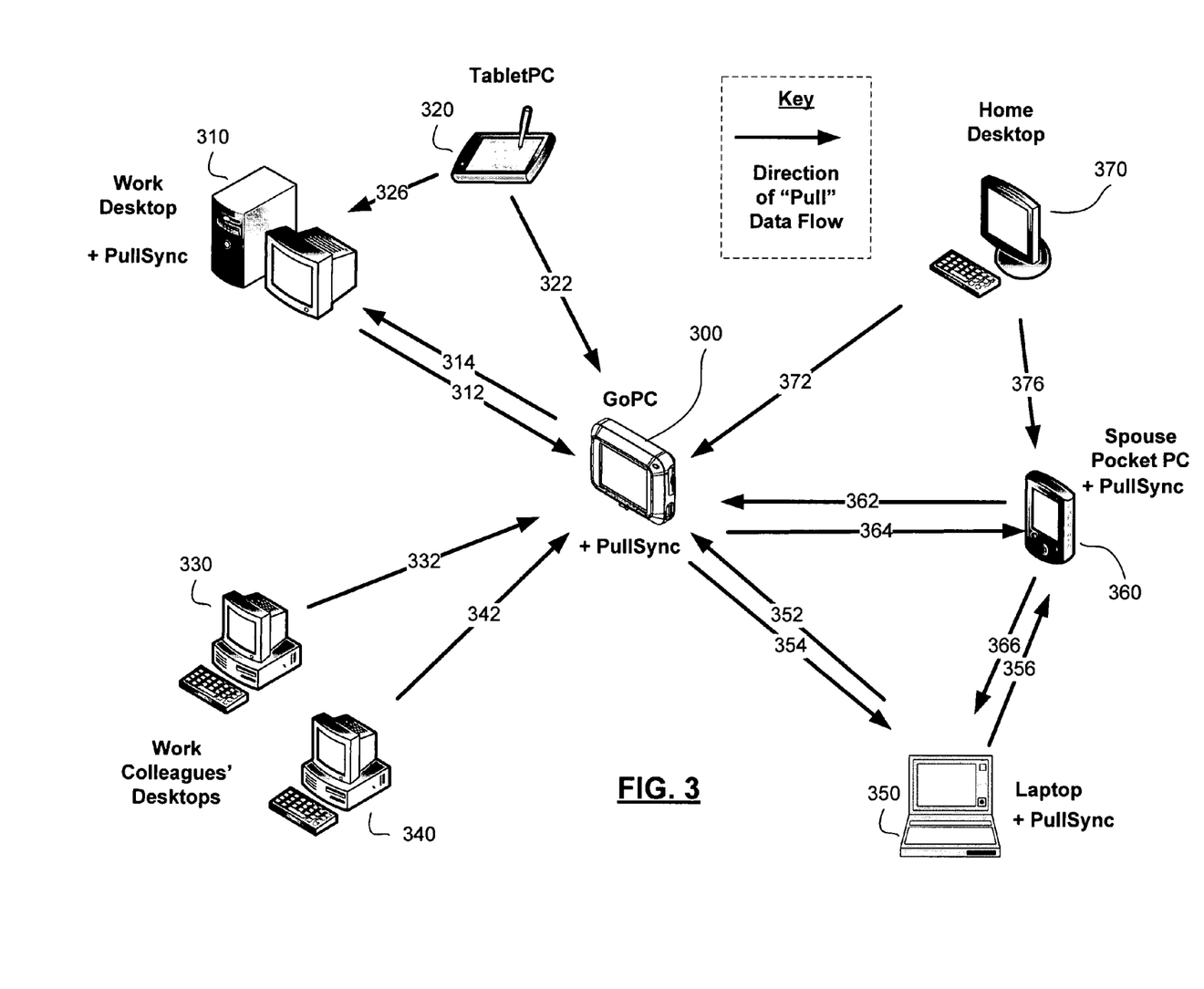
FIG. 3 is a block diagram representing the synchronization schema for several embodiments of the present invention on a contemporary network configuration comprising both wired and wireless devices.

FIG. 3 is a block diagram representing the synchronization schema for several embodiments of the present invention on a contemporary ad hoc network with a dynamic configuration comprising both wired and wireless devices that at one time or another are in contact with a common mobile computing device and/or each other. In the figure, the common mobile computing device 300 is an ultra-mobile computer device (e.g., the Microsoft GoPC) which communicates, using standard wireless networking protocols, with other computer system including but not limited to a work desktop 310 and a corresponding work TabletPC 320, work colleagues' desktops 330 and 340 respectively, a laptop 350, a spouse's Pocket PC 360, and a home desktop 370. The GoPC 300, comprising the PullSync software component (as shown), is able, at varying times (i.e., when the GoPC 300 has an active network connection with each such other computer system), to view and copy files from each of these systems over a wireless connection with each such device as shown by pull data flows 312, 322, 332, 342, 352, 362, and 372 using standard networking protocols.

For the systems lacking the PullSync software component, i.e., computer system 320, 330, 340, and 370, this synchronization occurs without said systems being aware that any synchronization operation is occurring, nor does this synchronization require any specialized software (other than said standard network protocols) on said systems for the PullSync operation on the GoPC 300 to occur. Similarly, the other computer systems that do have the PullSync software component, i.e., computer systems 310, 350, and 360, are also not necessarily aware of the pull-synchronization being performed by the GoPC (although such systems, including the GoPC, may include logic as part of the PullSync software component for identifying such synchronization through any of several means). However, these systems are capable of performing their own sync operations with both the GoPC and any other computer systems they are able to communicate with via a network connection. For example, while work colleagues' computer systems 330 and 340 can only be syncees for the GoPC, the spouse's Pocket PC 360 can sync with both the laptop 350 (data flow 356) and home desktop (data flow 376) as well as the GoPC 300 itself (data flow 364).

It should be noted that, for example, the GoPC 300, the laptop 350, and the spouse's Pocket PC 360 can fully sync with one another to the extent permitted by each computer systems PSRs. Furthermore, it should also be noted that the laptop 350 can indirectly sync with the home desktop 370 via the spouse's Pocket PC 360 or the GoPC 300 or both to the resultant combination of syncing limits based on the PSRs on all three PullSync systems. Of course, the laptop 350 could also sync directly with the home desktop 370 if a direct network connection is established (not shown), as would be the case with any PullSync computer system that is able to establish a network connection with any other computer system.

In regard to the PSRs, and for various embodiments of the present invention herein described, it should be noted that a present PSR only defines, for the computer system on which it resides, the specific files that are to be copied/pulled from other computer systems to itself—that is, an PSR defines the "syncer" (or file pulling) nature of the computer system on which it resides. Conversely, a PSR in no way dictates the operation of other computer systems in regard to the files those systems may or may not pull from the computer system on which that particular PSR resides (although the other computer systems may have their own distinct and separate PSRs if they are also using PullSync to copy files); instead, the only means for a syncee to designate which files can and cannot be copied from one computer system to another computer system (the latter using PullSync) is to place those files in shared or private folders accordingly (where shared folder contents can be copied while private folder contents cannot) which, in effect, defines the syncee (or "file sharing") nature of that computer system.

For several embodiments of the present invention, PullSync PSRs explicitly define the specific computer systems, specific folders, and characteristic files for copying/pulling from each other computer system in combination with other parameters specified by the PullSync end-user. For example, consider four computer systems, A, B, C, D, and E where, for this example, A is the syncer (having PullSync) and B, C, D, and E are potential syncees—i.e., A shares at least one common network with each of B, C, D, and E, although B, C, D, and E may not share any network amongst themselves. In this example, A may have an PSR as follows:

| A's Sync Peers: | Folders to Sync: | Rules: |
|---|---|---|
| B | MyPictures | *.jpg (only JPEG files) |
|  | MyHomeDocs | *.* (all files) |
|  | MyMusic | *.* <28 days old (all files modified or created within the last 28 days) |
| C | MyWorkDocs | status*.* (only files w/ "status" in the first part of the filename) |
| E | MyVideo | *.mpg, *.wmv, *.mov (only these file types) |
|  | MyPictures | *.* <90 days old (all files modified or created within the last 28 days) |
|  | MyMusic | *.WMA <2 MB each (all WMA files less then 2 MB) |

In this example, A, when syncing with B, will pull all *.jpg files from the MyPictures shared folder resident on B, as well as all of the files in B's MyHomeDocs shared folder and all files less than twenty-eight days old from B's MyMusic shared folder. When syncing with C, A will pull only those files in C's MyWorkDocs shared folder with filenames that start with "status" and nothing else (which would include, e.g., "statuslog.doc" and "status-040428-update.xls" but would not include, e.g., "backorderstatus.txt"). When syncing with E, A will pull only *.mpg, *.wmv, and *.mov files from E's MyVideo shared folder, all files less than ninety days old from E's MyPictures shared folder, and all WMA files less than two megabytes from E's MyMusic shared folder. Moreover, A would not pull any files from D as D (and its shared folders and files) is not listed in A's PSR.

For certain embodiments of the present invention, the destination on the syncer (A in our example) for files pulled from other computer systems (B, C, and E) may be, by default, a corresponding shared folder on A having the same name. Other embodiments, however, may instead specify a location for such files in the PSR on a rule-by-rule basis or by additional conditional rules. Moreover, the PSR may comprise logic that would prevent its computer system (A) from copying files from other computer system (B, C, and E) that are covered by the PSR but which have been previously copied or which already exist in their present form on that computer system (A). This may be determined by filename, file date and time, or some other logical mechanism. For pulling a file from another computer system with the same name as a file already in the corresponding folder but the other computer system's file has a more recent date/time stamp, certain embodiments may simply overwrite the old file with the new or, alternately, rename the old file and/or move it to an old-file archive or, alternately, employ another technique altogether.

For several embodiments of the present invention, the PSR may also comprise an additional second set of rules ("2SRs") in addition to the aforementioned rules (the "first set of rules" or "1 SRs"). Whereas the first set of rules (1 SRs) may pertain only to the "pull" element of PullSync (i.e., which files to pull from where and when, as previously described), this second set of rules (2SRs) may apply to files that exist on its own system—that is, a file maintenance and management set of rules by nature. This second set of rules (2SRs) may, for certain embodiments, apply only to the contents of the shared folders on its computer system and define, for example, how long to keep certain files (i.e., *.jpg files in a MyPictures shared folder for no more than sixty days, and *.mpg files in a MyVideo shared folder for no more than three days). In any event, the 2SRs, like the 1 SRs, may be highly varied in function, capability, and implementation to provide numerous options on the computer system to which they apply. For several embodiments of the present invention, not only are the rules themselves in an PSR modifiable, but the rule syntax, applicability, functionality, and content is also extendable with, for example, add-on modules and dynamic libraries, among other things.

For several embodiments of the present invention, an PSR may also further comprise a third set of rules (3SRs) regarding the frequency and/or manner of synchronization, a particularly useful feature for mobile computing devices. For the 3SRs, and in regard to frequency of synchronization, a mobile computing device—such as a laptop computer, a small computer system (e.g., an ultra-mobile PC), or a pseudo-computer device (e.g., a PDA)—that moves in and out of networks (via their wireless communication devices for example) would benefit from a decreasing rate of network/synchronization checking when not in a network. For example, a GoPC (an ultra-mobile computer device from Microsoft) moving from location to location will have access to one or more different networks at different times, as well as access to no networks at other times. While unable to connect to a network, and with the 3SRs, the GoPC might initially retry to connect with a network (see if one is out there) in one minute intervals for five minutes and, if no network has been found, check at five minute intervals for fifteen minutes and, again if no network has been found, check for a network at fifteen minute intervals until one is found (and then revert to the one-minute intervals when next again it begins to seek a new network). Frequency and duration of synchronization may also be subject to other rules related to battery life of the device, processor load, and various other parameters. In addition, and for certain embodiments, the PSR's third set of rules (3SR) may also comprise certain rules for selecting a computer to sync with from among multiple computers in a single network that are available for syncing ("connection priority") or, in other contexts, for selection a network to sync in from among two or more networks available to sync with at a given time ("network priority"), and such rules may be based on speed, resource cost, monetary cost (for fee-based networks), network load, and/or a plethora of other criteria without limit.

Of course, as used herein, the division of the PSR into three rule sets is done merely to aid in the description of the functionality of these several aspects and embodiments of the invention, and nothing herein should be interpreted as limiting the PSR to specific rule groupings, numbers thereof, or characteristics thereof.

In addition, certain embodiments of the present invention are directed to synchronization webs using PullSync such that multiple computer systems, each having a network connection to at least one other computer system, synchronize with one another through natural propagation of shared folder files from one machine to another throughout the sync web (albeit limited on some level to the working of the individual PSRs on each machine). Thus, while certain embodiments of the present invention are directed to two-way synchronization by way of installing the one-way sync PullSync device on two computer systems so they can effectively sync with each other (and thus form a natural two-way sync relationship), other embodiments are directed to multi-direction synchronization where multiple computer systems, only some of which are running PullSync, perform limited synchronization with each other and, in some cases, through each other via a similar natural propagation.

Summary and Additional Features

To restate, expand upon, or add to the foregoing, the following are (1) brief but non-limiting summaries of specific inventive elements for various alternative embodiments of the present invention and/or (2) additional inventive features for various alternative embodiments of the present invention:

1. A PullSync computer system or device—and especially devices with dynamically changing networks including (a) mobile computing devices such as laptop computers and small computer devices such as the GoPC, and/or (b) other computer devices that interact with mobile computing devices—regularly polls for networks and devices it comes into contact with and regularly "pulls" new and/or updated files from shared folders on syncee computer systems in said networks.
2. Synchronization for a computer system having the PullSync wizard may be fully automated (i.e., occur automatically without any end-user intervention) when the PullSync system detects a network and finds a computer on that network that matches its PSR for syncing.
3. The PSRs may be revised/modified/expanded/limited directly by end-users, other applications, and/or automatically generated in several embodiments.
4. For several other embodiments, the concept of "shared folders" may also include, as between two devices, at least one "private folder" that would not otherwise be considered a shared folder but which is copyable via standard network copying protocols or other means.
5. Shared folders may also comprise "trusted folders" utilizing existing security and authentication protocols and the like for certain embodiments.
6. The PullSync wizards may be used to form a pure "pull" synchronization implementation where no files are ever "pushed" by one system to another.
7. PullSync is an entirely decentralized peer-to-peer synchronization system that requires no centralized synchronization server and, for several embodiments, there is no coordination (or even awareness) among or between different instances of PullSync operating on different computer systems being synced of the scope or extent of the overarching synchronization network. Nevertheless, some embodiments may include awareness logic to enhance the synchronization experience when syncing with another computer system that also has PullSync or, alternately, may comprise software for identifying and tracking overarching synchronization that occurs via one or more PullSync wizard systems in a defined or dynamic network.
8. PullSync is network independent (requires no network-specific software) as it is designed to run over any existing network using the well-establish protocols for that network.
9. Certain embodiments of the present invention are specifically directed to a peer-to-peer (no central sync server), rule-based (sync performed on each individual computer system based on local PSRs), total-pull (no files are pushed) synchronization system; one alternative embodiment is directed to same for a "roaming" (mobile) computer device; and additional alternative embodiments are directed to same for network-independence (or multi-networks), constant syncing, automatic operation and syncing, and the utilization of existing networking, security, and/or authentication protocols.
10. PullSync, in operation, may be a "traversal engine" (like a web crawler) that continuously searches the breadth and extent of its (possibly ever-changing) network(s) and network connection(s) to other computers and the folders and files therein for syncing and, for some such embodiments, for automatically detecting and syncing to same.
11. In another embodiment, PullSync can also be used with a specialized device, for example, with a hard disk drive device that, using PullSync, syncs with a computer system and backs-up the contents of that computer systems shared folders according to its own local PSRs. In an alternative embodiment, such a backup device may comprise additional means for copying/backing-up the entire computer system to which it syncs.
12. In another embodiment, a synchronization system utilizing PullSync is also pull-only, where no data is pushed as part of the synchronization process but instead synchronization is entirely achieved by pulling data (via the PullSync wizard).

CONCLUSION

The various system, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

What is claimed:

1. A method for synchronizing a first computer system with a second computer system, said first computer system utilizing pull-synchronization software for synchronizing with said second computer system and said second computer system including a shared directory, said method comprising:

said first computer system utilizing a network connection between said first computer system and said second computer system to access said shared directory in said second computer system;

said first computer system autonomously viewing at least one file in said shared directory in said second computer system, the at least one file associated with a filename extension;

said first computer system receiving a synchronization rule, wherein the synchronization rule directs the first computer system to copy files in the shared directory of the second computer that include the filename extension;

said first computer system autonomously ascertaining that said at least one file in said shared directory in said second computer system includes the filename extension and needs to be copied to said first computer system in order for said first computer system to be synchronized with said second computer system; and said first computer system autonomously copying said at least one file from said second computer system over said network connection.

2. The method of claim 1 wherein said second computer system is not aware that it is being synced with said first computer system.

3. The method of claim 1 wherein said network connection is a wireless connection.

4. The method of claim 1 wherein said first computer system is a mobile computer system with a dynamic network connection to said second computer system.

5. The method of claim 1 further comprising the utilization of existing standard network security protocols with regard to said network connection between said first computer system and said second computer system.

6. The method of claim 1 wherein the step of the first computer system ascertaining whether any of said at least one file on said second computer system needs to be copied to said first computer is performed by said first computer system in accordance with a set of synchronization rules.

7. The method of claim 6 wherein said set of synchronization rules define at least one sync parameter selected from a group consisting of a set of computer systems for syncing; a set of folders on computer systems for syncing; a set of files on computer systems for syncing; and a set of characteristics for files on computer systems for syncing; and a combination of at least two of the foregoing sync parameters.

8. The method of claim 6 wherein said set of synchronization rules further comprise a subset of rules for managing and maintaining said files on said first computer system.

9. The method of claim 6 wherein said first computer system actively seeks out at least one additional computer system with which to sync, and wherein a set of synchronization rules further comprise a subset of rules for managing the frequency of attempting to perform the synchronization operation.

10. A method for two-directional peer-to-peer synchronization for at least two computer systems in a network wherein each of said at least two computer systems utilizing pull-synchronization software for synchronizing with said second computer system, and wherein each of said at least two computer systems including shared directories said method comprising:

said first computer system utilizing a network connection between said first computer system and said second computer system to access said shared directory in said second computer system;

said first computer system viewing at least one file in said shared directory in said second computer system;

said first computer system ascertaining whether any of said at least one file in said shared directory in said second computer system needs to be copied to said first computer system in order for said first computer system to be synchronized with said second computer system;

said first computer system copying said at least one file from said second computer system over said network connection;

said second computer system utilizing a network connection between said second computer system and said first computer system to access said shared directory in said first computer system;

said second computer system viewing at least one file in said shared directory in said first computer system;

said second computer system ascertaining whether any of said at least one file in said shared directory in said first computer system needs to be copied to said second computer system in order for said second computer system to be synchronized with said first computer system; and said second computer system copying said at least one file from said first computer system over said network connection;

wherein the operations of said first computer system are performed independently from the operations of said second computer system.

11. A system for synchronizing a first computer system with a second computer system, said first computer system utilizing pull-synchronization software for synchronizing with said second computer system, and said second computer system including a shared directory, said system comprising:

said first computer system including means for utilizing a network connection between said first computer system and said second computer system to access said shared directory in said second computer system;

said first computer system including means for autonomously viewing at least one file in said shared directory in said second computer system, the at least one file associated with a timestamp;

said first computer system including means for receiving a synchronization rule, wherein the synchronization rule directs the first computer system to copy files in the shared directory that include timestamps within a predetermined time range;

said first computer system including means for autonomously ascertaining that said at least one file in said shared directory in said second computer system includes the timestamp and that the timestamp is within the predetermined time range and needs to be copied to said first computer system in order for said first computer system to be synchronized with said second computer system; and said first computer system including means for autonomously copying said at least one file from said second computer system over said network connection.

12. The system of claim 11 wherein said second computer system is not aware that it is being synced with said first computer system.

13. The system of claim 11 wherein said means for utilizing a network connection further comprises:

means for utilizing a wireless connection.

14. The system of claim 11 wherein said first computer system is a mobile computer system with a dynamic network connection to said second computer system.

15. The system of claim 11 further comprising means for utilizing the existing standard network security protocols with regard to said network connection between said first computer system and said second computer system.

16. The system of claim 11 wherein said means for ascertaining whether any of said at least one file on said second computer system needs to be copied to said first computer is performed by means for applying a set of synchronization rules.

17. The system of claim 16 wherein said means for applying a set of synchronization rules further comprises:

means for defining at least one sync parameter selected from a group consisting of a set of computer systems for syncing; a set of folders on computer systems for syncing; a set of files on computer systems for syncing; and a set of characteristics for files on computer systems for syncing; and a combination of at least two of the foregoing sync parameters.

18. The system of claim 16 wherein said means for applying a set of synchronization rules further comprises:

means for applying a subset of rules for managing and maintaining said files on said first computer system.

19. The system of claim 16 wherein said first computer system includes means for actively seeking out at least one additional computer system with which to sync, and wherein means for applying a set of synchronization rules further comprises means for applying a subset of rules for managing the frequency of attempting to perform the synchronization system.

20. A system for two-directional peer-to-peer synchronization for at least two computer systems in a network wherein each of said at least two computer systems utilizing pull-synchronization software for synchronizing with said second computer system, and each of said at least two computer systems including a shared directory, said system comprising:

said first computer system including circuitry for utilizing a network connection between said first computer system and said second computer system to access said shared directory in said second computer system;

said first computer system including circuitry for viewing at least one file in said shared directory in said second computer system;

said first computer system including circuitry for ascertaining whether any of said at least one file in said shared directory in said second computer system needs to be copied to said first computer system in order for said first computer system to be synchronized with said second computer system;

said first computer system including circuitry for copying said at least one file from said second computer system over said network connection;

said second computer system including circuitry for utilizing a network connection between said second computer system and said first computer system to access said shared directory in said first computer system;

said second computer system including circuitry for viewing at least one file in said shared directory in said first computer system;

said second computer system including circuitry for ascertaining whether any of said at least one file in said shared directory in said first computer system needs to be copied to said second computer system in order for said second computer system to be synchronized with said first computer system; and said second computer system including circuitry for copying said at least one file from said first computer system over said network connection;

wherein the operations performed by the circuitry of said first computer system are performed independently from the operations performed by the circuitry of said second computer system.

21. A computer-readable storage medium comprising computer-readable instructions for synchronizing a first computer system with a second computer system, said first computer system utilizing pull-synchronization software for synchronizing with said second computer system and said second computer including a shared directory, said computer-readable instructions comprising instructions for:

said first computer system utilizing a network connection between said first computer system and said second computer system to access said shared directory in said second computer system;

said first computer system autonomously viewing at least one file in said shared directory in said second computer system;

said first computer system including means for receiving a synchronization rule, wherein the synchronization rule directs the first computer system to copy files in the shared directory that are a predetermined size;

said first computer system autonomously ascertaining that said at least one file in said shared directory in said second computer system has a file size that is the predetermined size and needs to be copied to said first computer system in order for said first computer system to be synchronized with said second computer system; and said first computer system autonomously copying said at least one file from said second computer system over said network connection using a standard networking protocol.

22. The computer-readable instructions of claim 21 further comprising instructions whereby said second computer system is not aware that it is being synced with said first computer system.

23. The computer-readable instructions of claim 21 further comprising instructions whereby said instructions in said first computer system for utilizing a network connection between said first computer system and said second computer system include instructions for utilizing a wireless connection.

24. The computer-readable instructions of claim 21 further comprising instructions whereby said first computer system is a mobile computer system with a dynamic network connection to said second computer system.

25. The computer-readable instructions of claim 21 further comprising instructions for the utilization of existing standard network security protocols with regard to said network connection between said first computer system and said second computer system.

26. The computer-readable instructions of claim 21 wherein said instructions for ascertaining whether any of said at least one file on said second computer system needs to be copied to said first computer system in order for said first computer system to be synchronized with said second computer system comprises instructions performed by said first computer system in accordance with a set of synchronization rules.

27. The computer-readable instructions of claim 26 further comprising instructions whereby said set of synchronization rules define at least one sync parameter selected from a group consisting of a set of computer systems for syncing; a set of folders on computer systems for syncing; a set of files on computer systems for syncing; and a set of characteristics for files on computer systems for syncing; and a combination of at least two of the foregoing sync parameters.

28. The computer-readable instructions of claim 26 further comprising instructions whereby said set of synchronization rules further comprise a subset of rules for managing and maintaining said files on said first computer system.

29. The computer-readable instructions of claim 26 further comprising instructions whereby said first computer system actively seeks out at least one additional computer system with which to sync, and wherein a set of synchronization rules further comprise a subset of rules for managing the frequency of attempting to perform the synchronization instructions.

30. A computer-readable storage medium comprising computer-readable instructions for two-directional peer-to-peer synchronization for at least two computer systems in a network wherein each of said at least two computer systems utilizing pull-synchronization software for synchronizing with said second computer system and said second computer system including a shared directory, said computer-readable instructions comprising instructions for:

said first computer system utilizing a network connection between said first computer system and said second computer system to access said shared directory in said second computer system;

said first computer system viewing at least one file in said shared directory in said second computer system;

said first computer system ascertaining whether any of said at least one file in said shared directory in said second computer system needs to be copied to said first computer system in order for said first computer system to be synchronized with said second computer system;

said first computer system copying said at least one file from said second computer system over said network connection;

said second computer system utilizing a network connection between said second computer system and said first computer system to access said shared directory in said first computer system;

said second computer system viewing at least one file in said shared directory in said first computer system;

said second computer system ascertaining whether any of said at least one file in said shared directory in said first computer system needs to be copied to said second computer system in order for said second computer system to be synchronized with said first computer system; and said second computer system copying said at least one file from said first computer system over said network connection;

wherein said instructions of said first computer system are performed independently from said instructions of said second computer system.

\* \* \* \* \*